(12) United States Patent
Ardeli et al.

(10) Patent No.: US 9,509,661 B2
(45) Date of Patent: Nov. 29, 2016

(54) METHOD AND APPARATUS FOR DISPLAYING HTTPS BLOCK PAGE WITHOUT SSL INSPECTION

(71) Applicant: Aruba Networks, Inc., Sunnyvale, CA (US)

(72) Inventors: Ramesh Ardeli, Sunnyvale, CA (US); Venkatesan Marichetty, Danville, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 35 days.

(21) Appl. No.: 14/527,245

(22) Filed: Oct. 29, 2014

(65) Prior Publication Data

US 2016/0127317 A1   May 5, 2016

(51) Int. Cl.
  *H04L 29/06* (2006.01)
  *H04L 9/00* (2006.01)
  *H04L 29/08* (2006.01)

(52) U.S. Cl.
  CPC ........... *H04L 63/0236* (2013.01); *H04L 63/10* (2013.01); *H04L 63/166* (2013.01); *H04L 67/14* (2013.01); *H04L 63/0227* (2013.01); *H04L 63/0281* (2013.01)

(58) Field of Classification Search
  CPC ........... H04L 63/0227; H04L 63/0236; H04L 63/0263; H04L 63/0281; H04L 63/10; H04L 63/166
  See application file for complete search history.

(56) References Cited

U.S. PATENT DOCUMENTS

| | | | |
|---|---|---|---|
| 2003/0177353 A1* | 9/2003 | Hiltgen | G06F 21/34 713/161 |
| 2008/0263215 A1* | 10/2008 | Schnellbaecher | H04L 63/0281 709/229 |
| 2011/0264905 A1* | 10/2011 | Ovsiannikov | H04L 29/08792 713/151 |
| 2014/0172945 A1* | 6/2014 | Hershberg | H04L 67/2814 709/202 |
| 2015/0222526 A1* | 8/2015 | Baykal | H04L 45/74 370/352 |

OTHER PUBLICATIONS

Fortinet, "Configuring FortiOS v5.0 Webfiltering for HTTPS scanning without SSL Deep Scanning", Dec. 5, 2013 (document properties), pp. 1-3 http://web.archive.org/web/20141021151617/http://docs.fortinet.com/uploaded/files/1705/fortigate-https-webfiltering-without-ssl-deep-scan-50.pdf.*

* cited by examiner

Primary Examiner — Jung Kim
Assistant Examiner — Carlos M De Jesus Lassala
(74) Attorney, Agent, or Firm — Brooks, Cameron & Huebsch, PLLC

(57) ABSTRACT

The present disclosure discloses a method and system for displaying an HTTPS block page without SSL inspection. Specifically, a network device snoops a first message transmitted between a client device and a network resource. The first message is transmitted as part of a SSL Handshake between the client device and the network resource to establish a SSL session. Moreover, the network device determines whether the client device is authorized to access the network resource. If not, the network device blocks the establishment of a SSL session between the client device and the network resource, and spoofs the network resource for establishing the SSL session between the client device and the network device instead of establishment of the SSL session between the client device and the network resource. Otherwise, the network device refrains from blocking the establishment of the SSL session between the client device and the network resource.

19 Claims, 7 Drawing Sheets

WEB CONTENT CLASSIFICATION
REPUTATION TABLE
200

| RISK SCORE 220 | REPUTATION 240 |
|---|---|
| 1-20 | HIGH RISK |
| 21-40 | SUSPICIOUS |
| 41-60 | MODERATE RISK |
| 61-80 | LOW RISK |
| 81-100 | TRUSTWORTHY |

FIG. 2A

WEB CONTENT CLASSIFICATION
CATEGORY TABLE
250

| WEB CATEGORY IDENTIFIER 260 | CATEOGRY NAME 280 |
|---|---|
| 0 | UNCATEGORIZED |
| 1 | REAL ESTATE |
| 2 | COMPUTER/INTERNET SECURITY |
| 3 | FINANCIAL SERVICES |
| 4 | BUSINESS ECONOMY |
| 5 | COMPUTER/INTERNET INFO |
| 6 | AUCTIONS |
| 7 | SHOPPING |
| 8 | CULT AND OCCULT |
| 9 | TRAVEL |
| 10 | ABUSED DRUGS |
| 11 | ADULT/PORNOGRAPHY |
| 12 | HOME/GARDEN |
| 13 | MILITARY |
| 14 | SOCIAL NETWORKING |
| 15 | DEAD SITES |
| ... ... | ... ... |

FIG. 2B

METHOD AND APPARATUS FOR DISPLAYING HTTPS BLOCK PAGE WITHOUT SSL INSPECTION

FIELD

Embodiments of the present disclosure relate to network content management by network devices. In particular, embodiments of the present disclosure describe a method and network device for displaying Hypertext Transfer Protocol Secure (HTTPS) block page without Secure Sockets Layer (SSL) inspection.

BACKGROUND

Conventional provisions exist to filter HTTPS content based on uniform resource locator (URL) filtering, or filter HTTPS-based applications, such as, Facebook®, Twitter®, etc., using deep packet inspection (DPI). However, to present a meaningful response to a client device in the form of an appropriate block page, the HTTPS content needs to be deep inspected. Because SSL inspection is processor intensive as it involves decryption, inspection and re-encryption of the same content, the throughput will be significantly lowered compared to a content pass-through model. Therefore, no provision is currently available to block HTTPS content and/or HTTPS-based applications, and to present the end-user with a meaningful block page without SSL inspection when content is blocked based on URL filtering rules or application-based rules.

DETAILED DESCRIPTION

In the following description, several specific details are presented to provide a thorough understanding. While the context of the disclosure is directed to network content management by network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 2A shows a block diagram illustrating exemplary web content classification reputation table according to embodiments of the present disclosure.

FIG. 2B shows a block diagram illustrating exemplary web content classification category table according to embodiments of the present disclosure.

OVERVIEW

Embodiments of the present disclosure relate to network content management by network devices. In particular, embodiments of the present disclosure describe a method and network device for displaying HTTPS block page without SSL inspection.

Embodiments of the present disclosure inspect plain and/or un-encrypted SSL handshake messages (e.g., a Client Hello message or a Server Certificate message) and fetch server name from server name extension in the Client Hello message. If the content needs to be blocked, the connection is intercepted by a firewall network device by sending a Transportation Control Protocol (TCP) reset (RST) message to the server. The firewall network device mimics as the server to the client device by terminating the connection using network address translation (NAT) after a 3-way TCP connection establishment process is complete. Unlike a captive portal where HTTP/HTTPS connection is terminated on a firewall device by redirecting to control-plane after NAT, the connection here is terminated after receipt of SSL handshake message(s) rather than on receipt of TCP SYN. Moreover, the original connection is redirected to block page using HTTP 302 redirect message.

With the solution provided herein, a network device snoops a first message transmitted between a client device and a network resource. Here, the first message is transmitted as part of a Secure Sockets Layer (SSL) Handshake between the client device and the network resource to establish a SSL session. Next, the network device determines whether the client device is authorized to access the network resource. Responsive to determining that the client device is not authorized to access the network resource, the network device blocks the establishment of a SSL session between the client device and the network resource; and, spoof the network resource for establishing the SSL session between the client device and the network device instead of establishment of the SSL session between the client device and the network resource. On the other hand, responsive to determining that the client device is authorized to access the network resource, the network device refrains from blocking the establishment of the SSL session between the client device and the network resource.

Network Computing Environment

Figure 1:
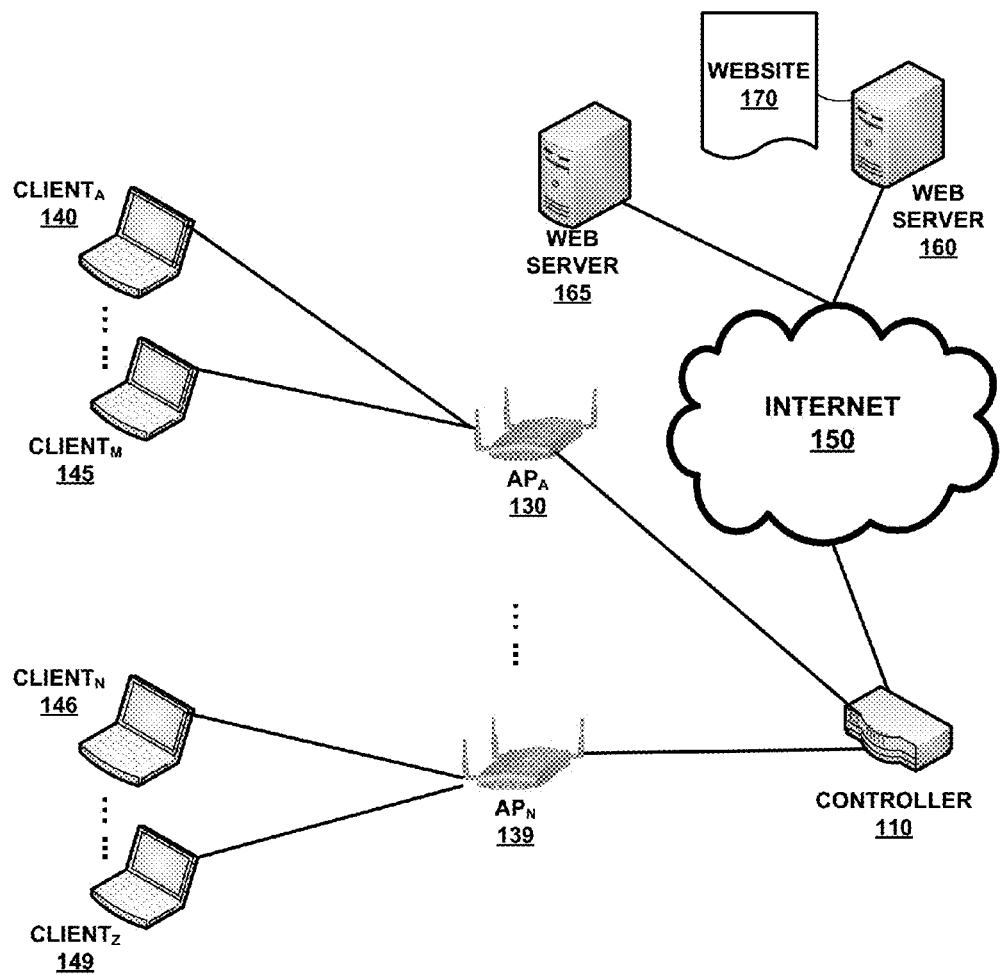
FIG. 1 shows an exemplary network environment according to embodiments of the present disclosure.

FIG. 1 shows an exemplary network environment according to embodiments of the present disclosure. Specifically, FIG. 1 illustrates a network that includes at least a number of web servers, including a web server 160 that hosts a website 170 and a web server 165, Internet 150, a network controller 110, a number of access points (APs) (such as, $AP_A$ 130 to $AP_N$ 139), and a plurality of client devices, such as $Client_A$ 140, . . . , $Client_M$ 145, $Client_N$ 146, . . . , $Client_Z$ 149, etc.

Web server 160 or 165 generally refers to a network computer system that processes requests via Hypertext Transfer Protocol (HTTP). HTTP generally refers to a network protocol that is used to distribute information by exchanging or transferring hypertext on the World Wide Web (WWW). Hypertext generally refers to structured text that uses logical links (hyperlinks) between nodes containing text. In the example illustrated in FIG. 1, web server 160 hosts website 170, which includes, for example, one or more text files, image files, advertisements, movie links, etc.

Note that, web server 160 or 165 can also provide other services. In general, a service is an abstraction of web resources. A client device can be agnostic of how the server performs while fulfilling the request and delivering the response. The client device only needs to understand the response based on a mutually agreed application protocol, e.g., HTTP, FTP, etc.

Web server 160 and/or web server 165 may be connected to network controller 110 via an Internet 150. Alternatively, web server 160 and/or web server 165 may be a part of the same wired and/or wireless local area network that network controller 110 belongs to.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF™ technology for OSI Layer 4-7 application control, multicast Domain Name System (DNS) optimization, IP roaming, and Security Assertion Markup Language (SAML) integration based on user roles, devices, applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

Access points, e.g., $AP_A$ 130 to $AP_N$ 139, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. For illustration purposes only, assuming that, in FIG. 1, a first set of client devices, such as $Client_A$ 140, . . . , $Client_M$ 145, associate with $AP_A$ 130. Moreover, assuming that a second set of client devices, such as $Client_N$ 146, . . . , $Client_Z$ 149, associate with $AP_N$ 139.

During operations, client devices (e.g., $Client_A$ 140 to $Client_Z$ 149) and servers (e.g., web server 160) exchange messages following a request-response pattern. Specifically, a client device (e.g., $Client_A$ 140) initially sends a request message. The request message will be received by $AP_A$ 130 that $Client_A$ 140 is associated with. $AP_A$ 130 then forwards the request to the network infrastructure. In the example illustrated in FIG. 1, network controller 110 will receive the request message, inspect the network packet, apply network policies, and forward the request message to its destination (e.g., web server 160). Then, web server 160 returns a response message. A server (e.g., web server 160) may deny access to a web resource by client devices. Moreover, network controller 110 may apply network policies to filter the content of the web resource hosted at the server, and determine to block the client device's (e.g., $Client_A$ 140) access to the content, for example, based on a reputation, a category, and/or deep packet inspection (DPI) classification of the web content and/or web application.

Web Content Classification

FIG. 2A shows a block diagram illustrating exemplary web content classification reputation table according to embodiments of the present disclosure. Web content classification reputation table 200 shown in FIG. 2A includes at least a risk score 220 field and a reputation 240 field. Risk score 220 generally refers to a score given for a particular URL by a third party service. Reputation 240 generally indicates a reputation classification for the particular URL based on its risk score. For example, a risk score of 1 to 20 indicates that the web content and/or application is at high security risk; a risk score of 21 to 40 indicates that the web content and/or application is suspicious for security risk; a risk score of 41 to 60 indicates that the web content and/or application is at moderate security risk; a risk score of 61 to 80 indicates that the web content and/or application is at low security risk; a risk score of 81 to 100 indicates that the web content and/or application is trustworthy; etc.

FIG. 2B shows a block diagram illustrating exemplary web content classification category table according to embodiments of the present disclosure. Web content classification category table 250 shown in FIG. 2B includes at least a web category identifier 260 field and a category name 280 field. Web category identifier 260 generally refers to a unique identifier associated with a particular web category. Category name 280 generally describes the name for each web content category. For example, identifier 0 indicates that the web content is uncategorized; identifier 1 indicates that the web content is related to real estate; identifier 2 indicates that the web content is related to computer/Internet security; identifier 3 indicates that the web content is related to financial services; identifier 4 indicates that the web content is related to business economy; etc.

Web Content Filtering

Figure 3:
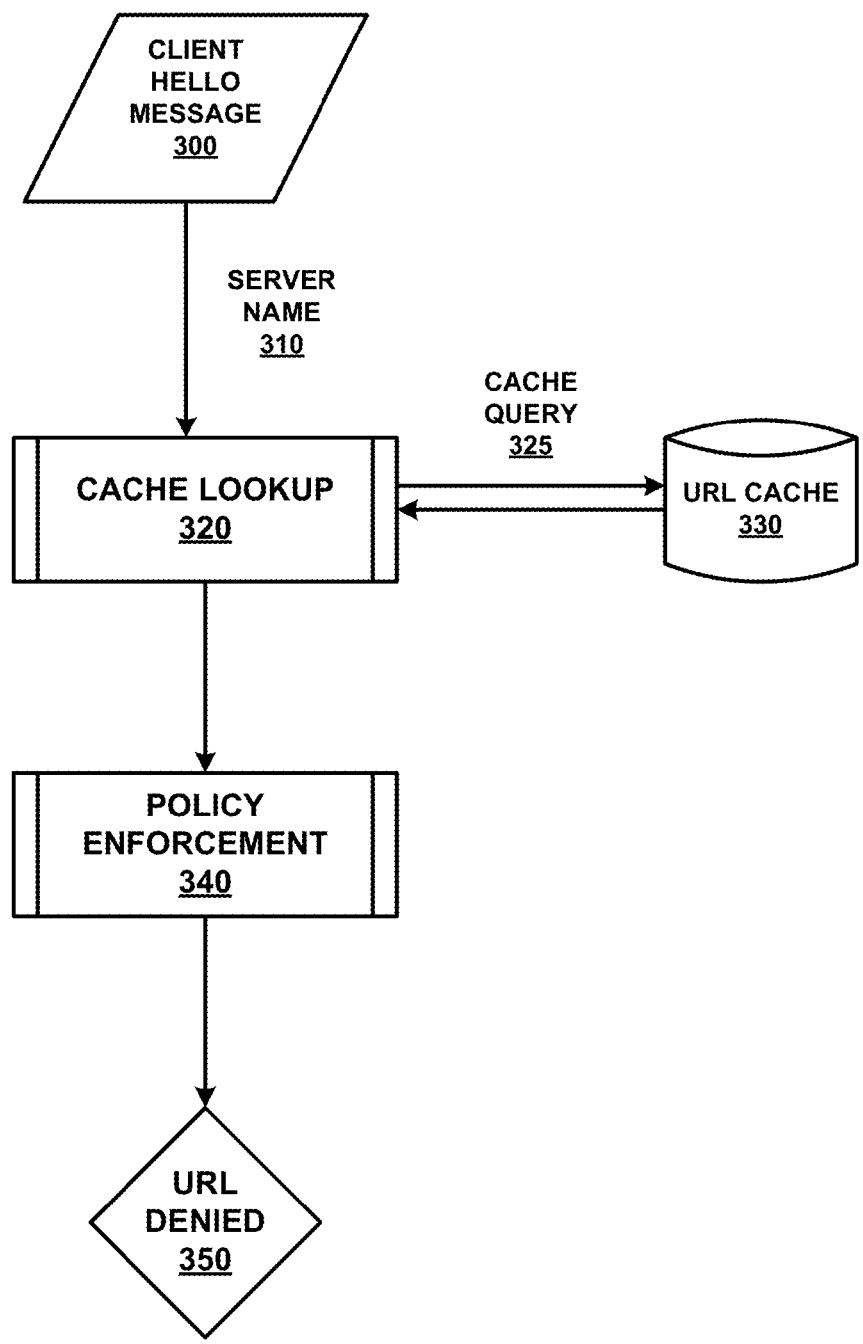
FIG. 3 shows a block diagram illustrating an exemplary content filtering mechanism according to embodiments of the present disclosure.

FIG. 3 shows a block diagram illustrating an exemplary content filtering mechanism according to embodiments of the present disclosure. FIG. 3 includes at least a URL cache 330 that caches a number of URLs and their reputation and/or category classifications. In some embodiments, an external server stores all URLs and their corresponding reputation and/or category classifications. A subset of the most popular URLs (e.g., the most popular 1 million URLs) is stored in a local URL cache 330 for fast access.

To filter the web content, a network controller snoops a Client Hello message 300 that is transmitted from a client device to a server. Client Hello message 300 is unencrypted. Thus, the network device can inspect the payload of Client Hello message 300 and retrieve a server name 310. Based on server name 310, the network controller performs a cache lookup 320. Specifically, the network device performs a cache query 325 in URL cache 330 based on server name 310. In response, URL cache 330 returns reputation and/or category classifications associated with server name 310 if server name 310 exists in URL cache 330. If server name 310 does not exist in URL cache 330, the network controller will retrieve the reputation and/or category classifications for server name 310 from the external server and store them in URL cache 330.

Next, based on the reputation and/or category classifications returned from cache lookup 320, the network controller perform policy enforcement 340. Specifically, a set of policies can be preconfigured by the network administrator. For example, a network administrator may specify that no shopping websites can be accessed during work hours. Thus, if a client device attempts to access a URL that is classified as in the shopping category during the hours between 9 am and 5 pm, policy enforcement engine 340 will determine that access is denied 350.

HTTPS Block Page

Figure 4:
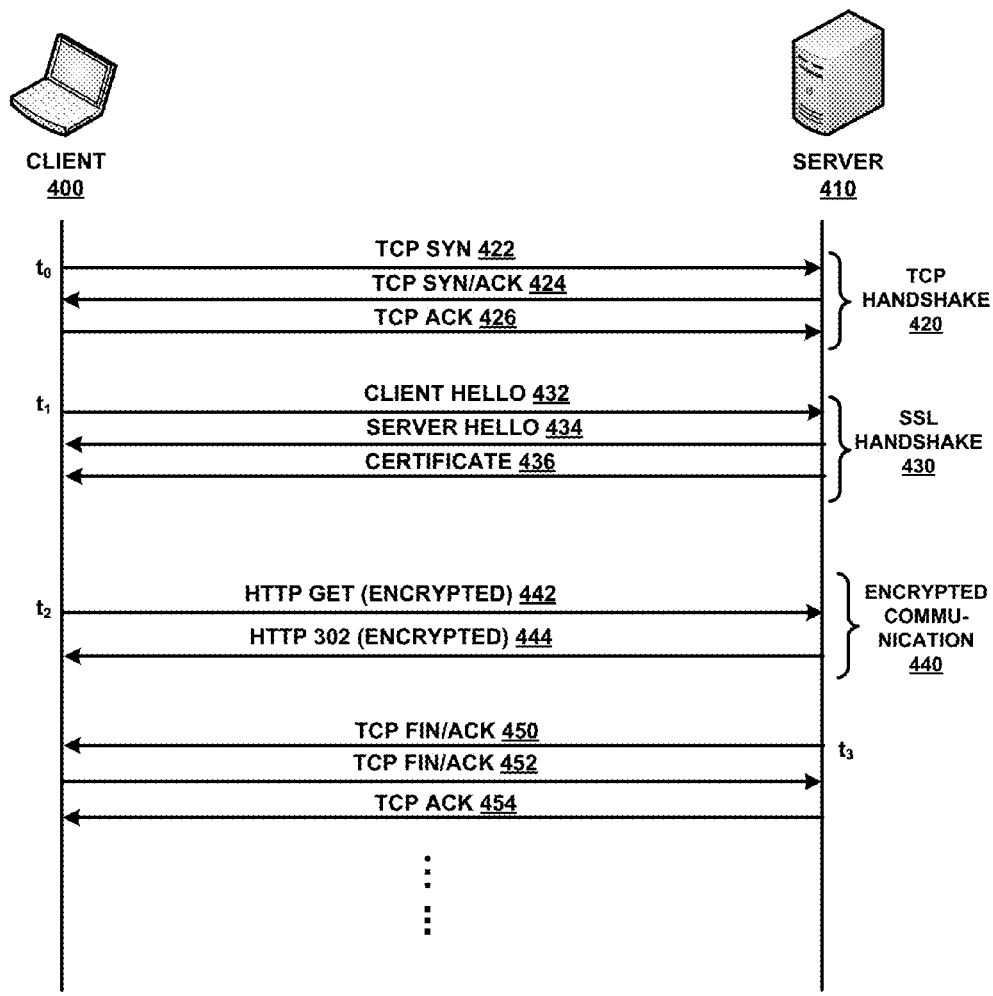
FIG. 4 shows a sequence diagram illustrating exemplary network communication exchanges involving an HTTPS block page according to embodiments of the present disclosure.

FIG. 4 shows a sequence diagram illustrating exemplary network communication exchanges involving an HTTPS block page according to embodiments of the present disclosure. FIG. 4 includes at least a client device 400 and a server 410. In order to retrieve a website hosted by server 410 (e.g., cnn.com), client device 400 initiates a three-way handshake 420 to establish a Transmission Control Protocol (TCP) connection at time point $t_0$. The three-way TCP handshake 420 includes at least a TCP SYN message 424 that client device 400 sends to server 410. Client device 400 will set the segment's sequence number to a random value A. In response, server 410 replies with a TCP SYN/ACK message 424. The acknowledgment number is set to be one more than the received sequence number i.e. A+1, and the sequence number that the server chooses for the packet is another random number, B. Finally, client device 400 sends a TCP ACK 426 back to server 410. The sequence number is set to the received acknowledgement value i.e. A+1, and the acknowledgement number is set to one more than the received sequence number i.e. B+1. Thereafter, a full-duplex TCP connection is established.

At time point $t_1$, after establishment of TCP connection, client device 400 will initiate an SSL handshake 430 by sending a CLIENT HELLO message 432 to server 410. Then, server 410 will return a SERVER HELLO message 434 to client device 400. Next, client device 400 will transmit CERTIFICATE 436 (and any other related SSL messages) to server 410.

Thereafter, client device 400 and server 410 start encrypted communications 440. Specifically, at time point $t_2$, client device 400 will transmit an encrypted HTTP GET message 442 to server 410. A typical HTTP GET message includes at least the following fields: a method (e.g., "GET"), a URL, a host (e.g., "cnn.com"), and a user agent. Because the URL is encrypted in HTTP GET message 442, a network controller will not be able to retrieve the URL without decrypting and re-encrypting HTTP GET message 442. In response, if the access is denied, server 410 will transmit an HTTP 302 message 444, which is also encrypted. The encrypted HTTP 302 message 444 is subsequently received and decrypted by client device 400. Hence, an error message is shown to client device 400.

After denying access, at time point $t_3$, server 410 transmits a TCP FIN/ACK message 450 to client device 400. Then, client device 400 transmits a TCP FIN/ACK message 452 back to server 410. Moreover, server 410 transmits TCP ACK message 454 to client device 400 to terminate the TCP connection session.

In an HTTP communication exchange, because the HTTP GET message from the client device to the server is unencrypted, a network controller can intercept the HTTP GET message, retrieve a particular URL from the unencrypted HTTP GET message, and apply preconfigured network policies to the particular URL in order to determine a level of access granted to the client device for the particular URL. This conventional web content filtering mechanism, however, does not work for HTTPS communication exchanges. Because HTTP GET message 442 is transmitted in encrypted form, it would significantly degrade the network controller's performance if the network controller performs SSL inspection, e.g., decrypting every HTTPS GET message, retrieving the URL, applying the policies, and re-encrypting the HTTPS GET message, etc.

Figure 5:
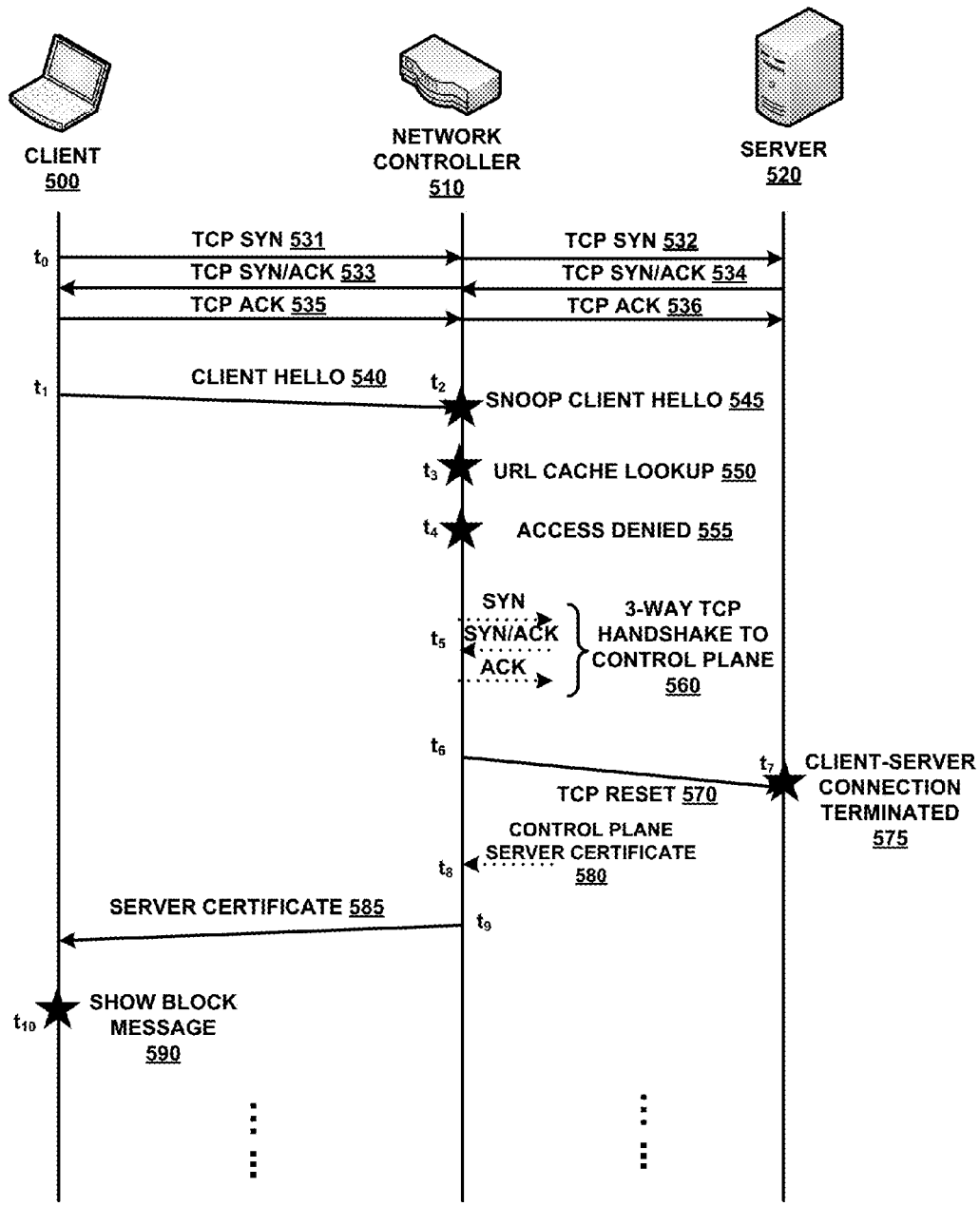
FIG. 5 shows a sequence diagram illustrating exemplary network communication exchanges involving an HTTPS block page without SSL inspection according to embodiments of the present disclosure.

FIG. 5 shows a sequence diagram illustrating exemplary network communication exchanges involving an HTTPS block page without SSL inspection according to embodiments of the present disclosure. Specifically, FIG. 5 includes at least a client device 500, a network controller 510, and a server 520. In order to retrieve a website hosted by server 520 (e.g., cnn.com), client device 500 initiates a three-way TCP handshake to establish a Transmission Control Protocol (TCP) connection at time point $t_0$. The three-way TCP handshake includes at least a TCP SYN message 531 that client device 500 sends to server 520. TCP SYN message 531 is received by network controller 510 and then forwarded to server 520 as TCP SYN message 532. In response, server 520 replies with a TCP SYN/ACK message 534. TCP SYN/ACK message 534 is also received by network controller 520 and forwarded to client device 500 as TCP SYN/ACK 533. Finally, client device 500 sends a TCP ACK message 535 back to server 520. TCP ACK message 535 is received at network controller 510 and forwarded by network controller 510 to server 520 as TCP ACK message 536. Thereafter, a TCP connection is established between client device 500 and server 520.

Once the TCP connection is established, SSL handshake process begins with client device 500 sending a CLIENT HELLO message 540 at time point $t_1$. Note that, CLIENT HELLO message 540 during SSL handshake is transmitted in an unencrypted form. Thus, network controller 510 can snoop CLIENT HELLO message 545 at time point $t_2$, and extract the server name from the extensions field in CLIENT HELLO message 540. At time point $t_3$, the extracted server name is subjected to local URL cache lookup 550 in the datapath of network controller 510 to get the web content category and/or reputation for server 520. In some embodiments, the packet is also subjected to deep packet inspection (DPI) to get the application classification identifier.

At this point, the session has the following attributes:
{Source IP, Destination IP, Source Port, Destination Port, Protocol, Application ID, Application Category ID, Web Content Category, Reputation}.

The session is then subjected to Application-based Access Control List (ACL) lookup, where firewall policies are defined based on the above attributes. In the example illustrated in FIG. 5, the session is access denied 555 after ACL lookup.

Next, network controller 510 sends a message from a datapath process to a control-plane process with the following information:
{Source IP, Source Port, Denied Reason, Application Name, Application Category Name, Web Content Category Name, Reputation}

In some embodiment, client device 500's access to a web application (e.g., a Facebook® application) is denied by an Application-based firewall policy. Thus, the message would be as follows:
{Source IP, Source Port, Application Denied, Application Name, Application Category Name}

In some embodiments, client device 500's access to an URL is blocked by a URL filtering firewall policy. Thus, the message would be as follows:
{Source IP, Source Port, URL Blocked, Web Content Category Name, Reputation}

Then, at time point $t_5$, a new TCP connection is established with same source IP address, source port, but using network controller 510's IP address as the destination address. Specifically, a 3-way TCP handshake is performed between the datapath and the control plane at network controller 510. For example, at time point $t_5$, the datapath of network controller 510 sends a SYN message to control plane. The control plane then replies with a SYN/ACK message to the datapath. The datapath transmits an ACK message to the control plane to complete the handshake process.

Once the 3-way handshake is performed and TCP connection established, the original connection is merged with the new connection through network address translation (NAT). At time point $t_6$, network controller 510 transmits a TCP reset (RST) message 570 to server 520. At time point $t_7$, server 520 receives TCP RST message 570; and, the client-server TCP connection is terminated 575 on the server end. Because the client-server TCP connection is not terminated on the client end, client device 500 can continue transmit packets in the TCP connection session. However, all subsequent network packets transmitted in the TCP connection session will be forwarded to the control plane at network controller 510, because the original connection is merged with the new connection through network address translation (NAT).

The firewall then forwards the original CLIENT HELLO message to the control plane at network controller 510. The SSL library in the control plane completes the SSL handshake process by responding with a SERVER HELLO message. Moreover, the control plane will present a self-generated server certificate 580 at time point $t_8$. At time point $t_9$, server certificate 585 is presented to client device 500.

If network controller 510 is not listed as a trusted authority at client device 500, client device will be prompted with a certificate warning. Once client device 500 accepts the certificate warning, resumes and completes the SSL handshake process, the subsequent application data sent from client device 500 is encrypted.

Specifically, client device 500 sends an encrypted HTTP GET message. The firewall forwards the encrypted data to the control plane at network controller 510, where SSL library decrypts the payload and sends the HTTP content to HTTP daemon running in the control plane. The HTTP daemon then uses the {source IP, Source Port} as key to find the reason why the session is blocked. Specifically, the HTTP daemon can send a message to the control plane process as previously mentioned.

Once the corresponding reason and information is found for the key {source IP, Source Port}, the HTTP daemon issues an HTTP 302 redirect message to client device 500. The HTTP 302 redirect message is then encrypted by SSL, as the message is sent on HTTPS connection.

The "Location" field in the HTTP is populated with the corresponding block page, followed by URL parameters indicating the application name and/or application category or web category and reputation.

For example, the URL will appear as the following if the session is blocked by a URL filtering policy:
https://blockurl.arubanetworks.com/cgi-bin/
blockurl?cmd=blockurl&category=sports&reputation=50
Here, the URL parameters indicate that the web content category is "sports" and reputation score for the URL is 50.

As another example, the URL will appear as the following if the session is blocked by Application-based firewall policy:
https://blockapp.arubanetworks.com/cgi-bin/
blockapp?cmd=blockapp&app=facebook&category=social-networking
Here, the URL parameters indicate that the application name is Facebook® and the application category is "social networking."

Upon receipt of the encrypted HTTP 302 redirect message, client device 500 terminates the TCP connection on the client end by transmitting a TCP FIN message. Next, network controller 510 responds with a FIN/ACK message to complete the TCP connection closure.

Client device 500 then initiates a new HTTPS connection to the redirected URL. Once the TCP connection is established and the SSL handshake process is complete, client device 500 sends encrypted HTTP GET for the redirected URL. If the redirected URL is located on the firewall device, such as network controller 510, the connection is established to the firewall device (e.g., network controller 510). Otherwise, if the redirected URL is located on an external device, the TCP connection is established to the external device.

The HTTP daemon process running on the firewall device and/or the external device then displays appropriate block message 590 to client device 500 based on the content received in URL parameters at time point $t_{10}$.

Process for Displaying HTTPS Block Page without SSL Inspection

Figure 6:
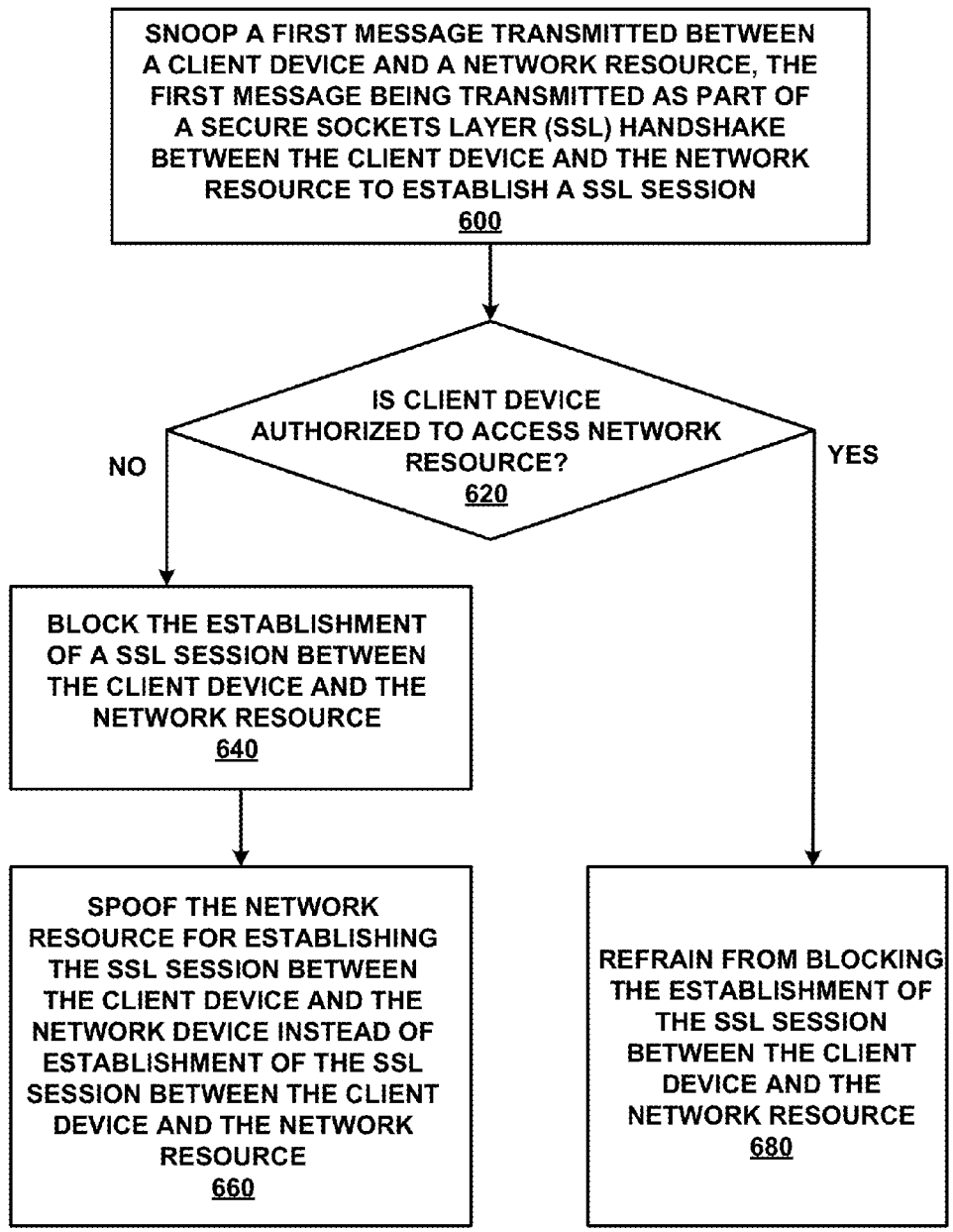
FIG. 6 illustrates an exemplary process for displaying HTTPS block page without SSL inspection according to embodiments of the present disclosure.

FIG. 6 illustrates an exemplary process for displaying HTTPS block page without SSL inspection according to embodiments of the present disclosure. During operations, a network device snoops a first message transmitted between a client device and a network resource (operation 600). Note that, the first message is transmitted as part of a Secure Sockets Layer (SSL) Handshake between the client device and the network resource to establish a SSL session. More specifically, the first message can be an initial message in the SSL Handshake that is transmitted from the client device and that is addressed to the network resource. In some embodiments, the first message is a certificate from the network resource to the client device.

Then, the network device determines whether the client device is authorized to access the network resource (operation 620). Responsive to determining that the client device is not authorized to access the network resource, the network device blocks the establishment of a SSL session between the client device and the network resource (operation 640); and, spoofs the network resource for establishing the SSL session between the client device and the network device instead of establishment of the SSL session between the client device and the network resource (operation 660). Responsive to determining that the client device is authorized to access the network resource, the network device refrains from blocking the establishment of the SSL session between the client device and the network resource (operation 680). In particular, the network device refrains from blocking the establishment of the SSL session by allowing the establishment of the SSL session between the client device and the network resource to proceed as normal without any intervention.

In some embodiments, subsequent to establishing the SSL session between the client device and the network device, the network device transmits a second message from the network device to the client device that (a) spoofs the network resource and (b) redirects the client device to a different second network resource. In some embodiments, subsequent to establishing the SSL session between the client device and the network device, the network device transmits a second message from the network device to the client device that (a) spoofs the network resource and (b) indicates an error message comprising information why the client device cannot access the network resource.

In some embodiments, responsive to determining that the client device is not authorized to access the network resource, the network device spoofs the client device in a second message transmitted by the network device to the network resource, the second message indicating a termination of communication between the network resource and the client device. Specifically, the network device can spoof the network resource by transmitting a certificate corresponding to the network device in response to a request from the client device for a certificate corresponding to the network resource.

In some embodiments, the network device determines whether the client device is authorized to access the network resource based on a set of rules indicating access permissions associated with the network resource.

In some embodiments, the network device determines whether the client device is authorized to access the network resource based on a category and/or reputation associated with the network resource.

In some embodiments, the network device determines whether the client device is authorized to access the network resources by determining whether the client device is authorized to access an application corresponding to the network resource. Note that, the application can be determined using a Deep Packet Inspection (DPI) classification.

System for Displaying HTTPS Block Page without SSL Inspection

Figure 7:
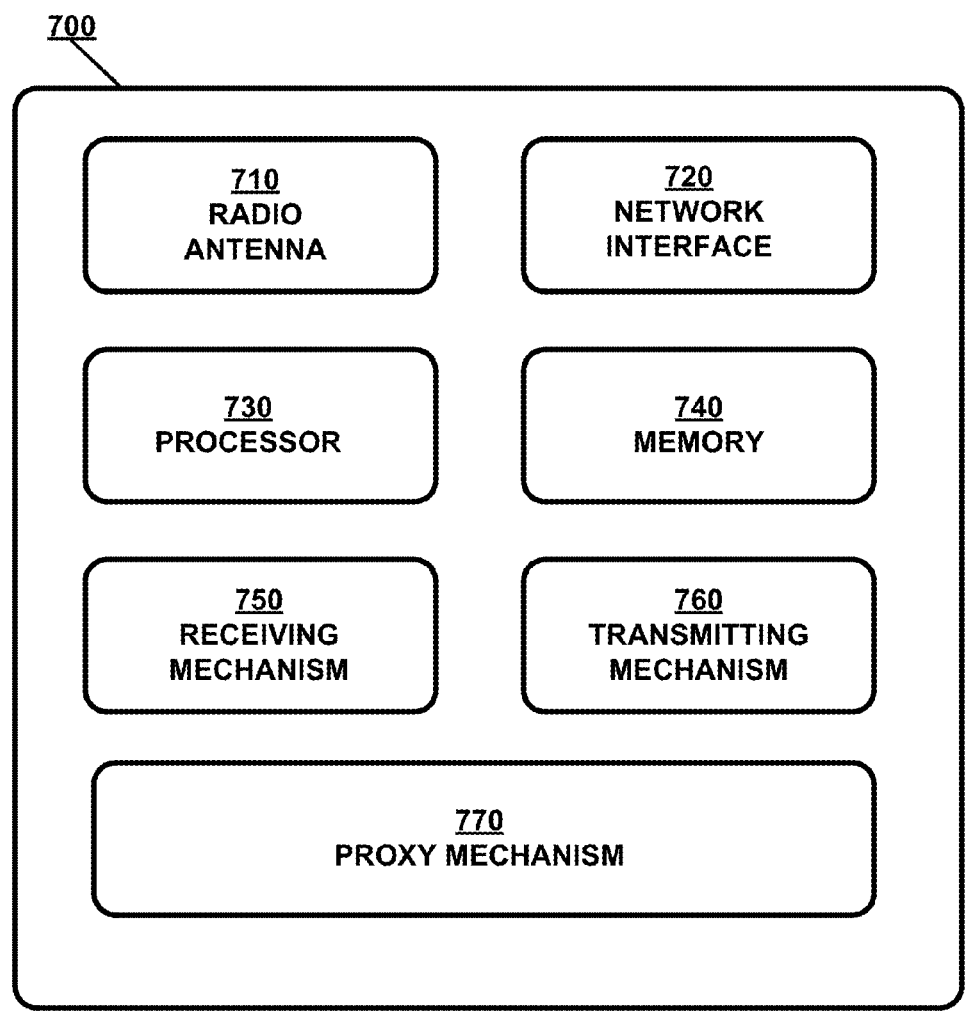
FIG. 7 is a block diagram illustrating an exemplary system for displaying HTTPS block page without SSL inspection according to embodiments of the present disclosure.

FIG. 7 is a block diagram illustrating an exemplary system for displaying HTTPS block page without SSL inspection according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, and a proxy mechanism 770, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on.

Transmitting mechanism 760 generally transmits messages, which include, but are not limited to, requests and/or responses, beacon frames, management frames, control path frames, and so on. Specifically, in some embodiments, subsequent to establishing the SSL session between the client device and the network device, transmitting mechanism 760 transmits a second message from the network device to the client device that (a) spoofs the network resource and (b) redirects the client device to a different second network resource. In some embodiments, subsequent to establishing the SSL session between the client device and the network device, transmitting mechanism 760 transmits a second message from the network device to the client device that (a) spoofs the network resource and (b) indicates an error message comprising information why the client device cannot access the network resource. In some embodiments, transmitting mechanism 760 transmits a certificate corresponding to the network device in response to a request from the client device for a certificate corresponding to the network resource.

Proxy mechanism 770 generally intercepts a network message, applies firewall policies, and forwards a portion of data to the recipient of the message. Specifically, proxy mechanism 770 can snoop a first message transmitted between a client device and a network resource. The first message can be transmitted as part of a Secure Sockets Layer (SSL) Handshake between the client device and the network resource to establish a SSL session. In some embodiments, the first message is an initial message in the SSL Handshake that is transmitted from the client device and that is addressed to the network resource. In some embodiments, the first message is a certificate from the network resource to the client device.

Furthermore, proxy mechanism 770 can determine whether the client device is authorized to access the network resource. Responsive to determining that the client device is not authorized to access the network resource, proxy mechanism 770 blocks the establishment of a SSL session between the client device and the network resource, and spoofs the network resource for establishing the SSL session between the client device and the network device instead of establishment of the SSL session between the client device and the network resource. Responsive to determining that the client device is authorized to access the network resource, proxy mechanism 770 refrains from blocking the establishment of the SSL session between the client device and the network resource.

In some embodiments, responsive to determining that the client device is not authorized to access the network resource, proxy mechanism 770 spoofs the client device in a second message transmitted by the network device to the network resource, the second message indicating a termination of communication between the network resource and the client device.

In some embodiments, proxy mechanism 770 determines whether the client device is authorized to access the network resource based on a set of rules indicating access permissions associated with the network resource. In some embodiments, proxy mechanism 770 determines whether the client device is authorized to access the network resource based on a category and/or reputation associated with the network resource. In some embodiments, proxy mechanism 770 determines whether the client device is authorized to access the network resources by determining whether the client device is authorized to access an application corresponding to the network resource. Here, the access to the application is determined using a Deep Packet Inspection (DPI) classification method.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes a network controller to perform operations comprising:

snooping a first unencrypted message transmitted between a client device and a network resource, the first unencrypted message being transmitted as part of a Secure Sockets Layer (SSL) Handshake between the client device and the network resource to establish a SSL session;

determining whether the client device is authorized to access the network resource;

responsive to determining that the client device is not authorized to access the network resource:

blocking the establishment of the SSL session between the client device and the network resource, wherein blocking the establishment of the SSL session a network device coupled by the network controller includes intercepting the first message and transmitting a transmission control protocol reset message to the network resource;

spoofing, by the network controller, the network resource for establishing the SSL session between the client device and the network controller instead of establishment of the SSL session between the client device and the network resource, wherein the network controller spoofs the network resource by transmitting a self-generated certificate corresponding to the network controller in response to a request from the client device for a certificate corresponding to the network resource;

receiving, from the spoofing network controller, all subsequent messages sent by the client device directed to the network resource; and responsive to determining that the client device is authorized to access the network resource, refraining from blocking the establishment of the SSL session between the client device and the network resource.

2. The medium of claim 1, wherein the operations further comprise, subsequent to establishing the SSL session between the client device and the spoofing network controller, transmitting a second message from the spoofing network controller to the client device that (a) spoofs the network resource and (b) redirects the client device to a different second network resource.

3. The medium of claim 1, wherein the operations further comprise, subsequent to establishing the SSL session between the client device and the spoofing network controller, transmitting a second message from the spoofing network controller to the client device that (a) spoofs the network resource and (b) indicates an error message comprising information why the client device cannot access the network resource.

4. The medium of claim 1, wherein responsive to determining that the client device is not authorized to access the network resource, the operations further comprise:
spoofing, by the spoofing network controller, the client device in a second message transmitted by the spoofing network controller to the network resource, the second message indicating a termination of communication between the network resource and the client device.

5. The medium of claim 1, wherein determining whether the client device is authorized to access the network resource is based on a set of rules indicating access permissions associated with the network resource.

6. The medium of claim 1, wherein the first unencrypted message is an initial message in the
SSL Handshake that is transmitted from the client device and that is addressed to the network resource.

7. The medium of claim 1, wherein the first unencrypted message is a certificate from the network resource to the client device.

8. The medium of claim 1, wherein the determination of whether the client device is authorized to access the network resource is based on a category and/or reputation associated with the network resource.

9. The medium of claim 1, wherein determining whether the client device is authorized to access the network resources comprises determining whether the client device is authorized to access an application corresponding to the network resource, the application being determined using a Deep Packet Inspection classification method.

10. A system comprising: a network controller including a hardware processor, the network controller being configured to:
detect performance of a 3-way Transmission Control Protocol (TCP) Handshake by a client device with a network resource to establish a first TCP connection;
snoop a first unencrypted message transmitted between the client device and the network resource, the first unencrypted message being transmitted as part of a Secure Socket Layer (SSL) Handshake between the client device and the network resource to establish a SSL session;
determine whether the client device is authorized to access the network resource;
responsive to the determination that the client device is not authorized to access the network resource:
block the establishment of the SSL session between the client device and the network resource, wherein the SSL session is blocked by the network controller intercepting the first message and transmitting a TCP reset message to the network resource;
spoof the network resource for establishing the SSL session between the client device and the network controller instead of establishment of the SSL session between the client device and the network resource, wherein the network controller spoofs the network resource by:
transmitting a self-generated certificate corresponding to the network controller in response to a request from the client device for a certificate corresponding to the network resource; and
self-generating a second TCP connection and merging it with the first TCP connection by using network address translation;
receive subsequent messages the client device directs to the network resource; and
responsive to the determination that the client device is authorized to access the network resource, refrain from blocking the establishment of the SSL session between the client device and the network resource.

11. The system of claim 10, wherein subsequent to establishing the SSL session between the client device and the network controller, transmitting a second message from the network controller to the client device that (a) spoofs the network resource and (b) redirects the client device to a different second network resource.

12. The system of claim 10, wherein subsequent to establishing the SSL session between the client device and the network controller, transmitting a second message from the network controller to the client device that (a) spoofs the network resource and (b) indicates an error message comprising information why the client device cannot access the network resource.

13. The system of claim 10, wherein responsive to determining that the client device is not authorized to access the network resource, the operations further comprise:
spoofing, by the network controller, the client device in a second message transmitted by the network controller to the network resource, the second message indicating a termination of communication between the network resource and the client device.

14. The system of claim 10, wherein determining whether the client device is authorized to access the network resource is based on a set of rules indicating access permissions associated with the network resource.

15. The system of claim 10, wherein spoofing, by the network controller, the network resource comprises transmitting a certificate corresponding to the network controller in response to a request from the client device for a certificate corresponding to the network resource.

16. The system of claim 10, wherein the first unencrypted message is an initial message in the SSL Handshake that is transmitted from the client device and that is addressed to the network resource.

17. The system of claim 10, wherein the first unencrypted message is a certificate from the network resource to the client device.

18. The system of claim 10, wherein the determination of whether the client device is authorized to access the network resource is based on a category and/or reputation associated with the network resource.

19. The system of claim 10, wherein determining whether the client device is authorized to access the network resources comprises determining whether the client device is authorized to access an application corresponding to the network resource, the application being determined using a Deep Packet Inspection classification method.

* * * * *